United States Patent

Helton

(10) Patent No.: US 10,526,049 B1
(45) Date of Patent: Jan. 7, 2020

(54) HATCH CLAMPING MECHANISM

(71) Applicant: Justin R. Helton, Fredericksburg, VA (US)

(72) Inventor: Justin R. Helton, Fredericksburg, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 16/149,548

(22) Filed: Oct. 2, 2018

(51) Int. Cl.
| | |
|---|---|
| *B63B 19/24* | (2006.01) |
| *B63B 19/00* | (2006.01) |
| *B63B 19/08* | (2006.01) |
| *B63B 19/14* | (2006.01) |
| *B63B 19/28* | (2006.01) |
| *F16H 19/08* | (2006.01) |

(52) U.S. Cl.
CPC .............. *B63B 19/24* (2013.01); *B63B 19/00* (2013.01); *B63B 19/14* (2013.01); *B63B 19/28* (2013.01); *F16H 19/08* (2013.01); *B63B 2019/0069* (2013.01)

(58) Field of Classification Search
CPC .. B63B 3/00; B63B 3/54; B63B 17/00; B63B 19/00; B63B 19/14; B63B 43/00; B63B 43/22

USPC .................. 114/117, 201 R, 203; 292/6, 260
See application file for complete search history.

(56) References Cited

U.S. PATENT DOCUMENTS

| 3,821,935 | A | * | 7/1974 | Adler | F16J 13/02 |
| | | | | | 114/201 R |
| 3,916,800 | A | * | 11/1975 | Hutchison | B65D 90/10 |
| | | | | | 114/203 |
| 4,020,778 | A | * | 5/1977 | Sutton | B63B 19/14 |
| | | | | | 114/203 |
| 4,273,064 | A | * | 6/1981 | Sutton | B63B 19/14 |
| | | | | | 114/203 |
| 4,928,615 | A | * | 5/1990 | Williams | E05C 9/06 |
| | | | | | 114/201 R |
| 5,329,869 | A | * | 7/1994 | Freeman | B63B 19/00 |
| | | | | | 114/203 |
| 5,441,005 | A | * | 8/1995 | Freeman | B63B 19/00 |
| | | | | | 114/203 |

\* cited by examiner

*Primary Examiner* — Lars A Olson
(74) *Attorney, Agent, or Firm* — Gerhard W. Thielman

(57) ABSTRACT

A lift assist mechanism is provided for positioning a hatch cover in relation to a corresponding opening in a hatch frame. The assist mechanism includes a torsion bar and a lifting mechanism. The torsion bar has first and second opposite ends. The first end secures to the hatch frame. The second end connects to a bar spur gear. The lifting assembly includes a lift spur gear and a hinge gear. The lift spur gear engages the bar spur gear. The gears convert an acute angle twist of the bar to substantially perpendicular pivot the hatch cover from the hatch frame.

8 Claims, 13 Drawing Sheets

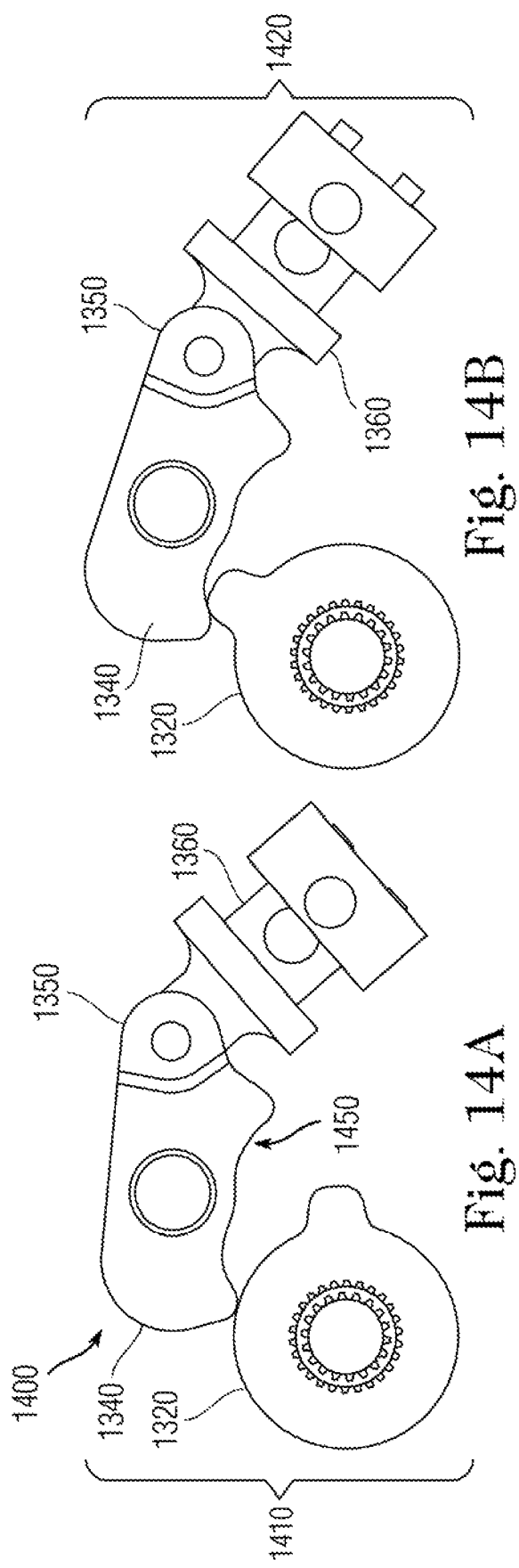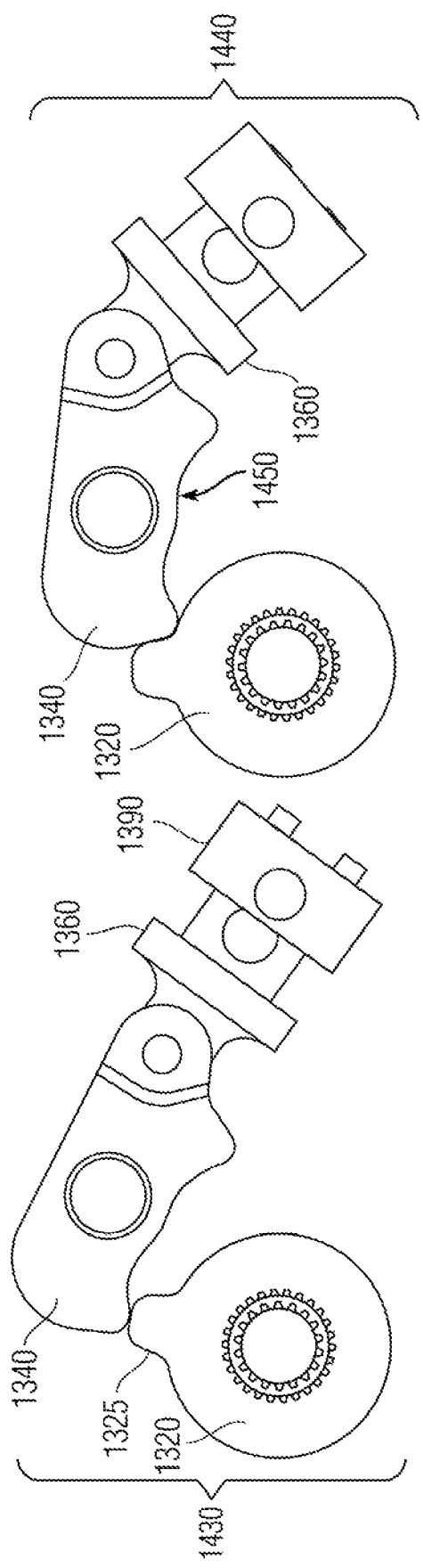

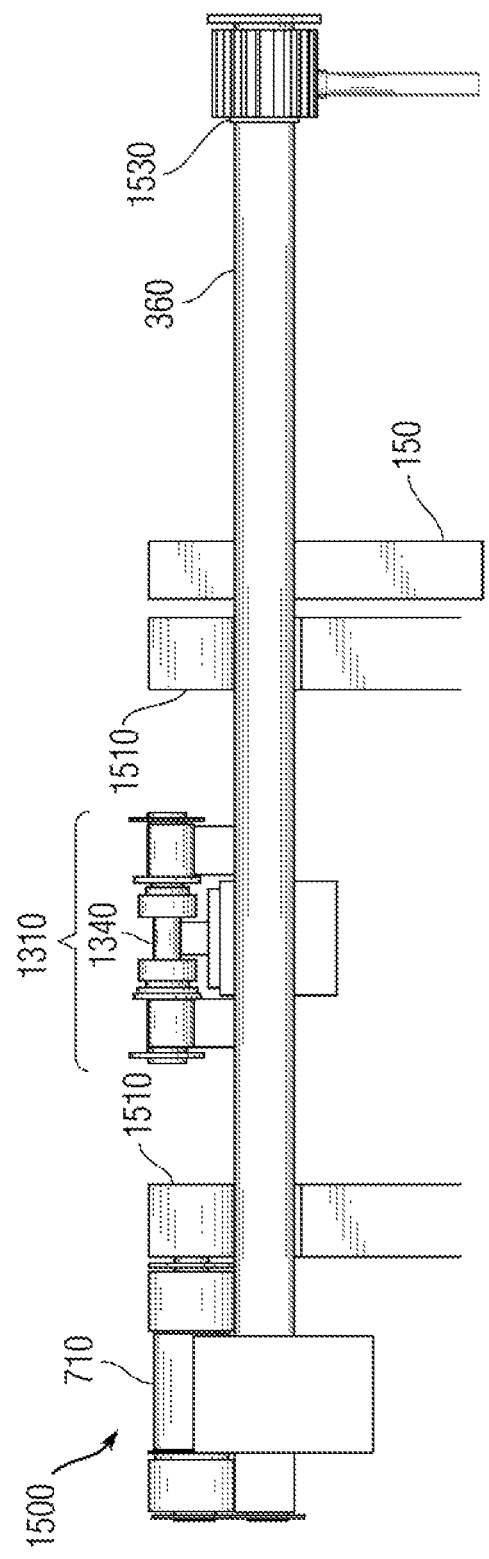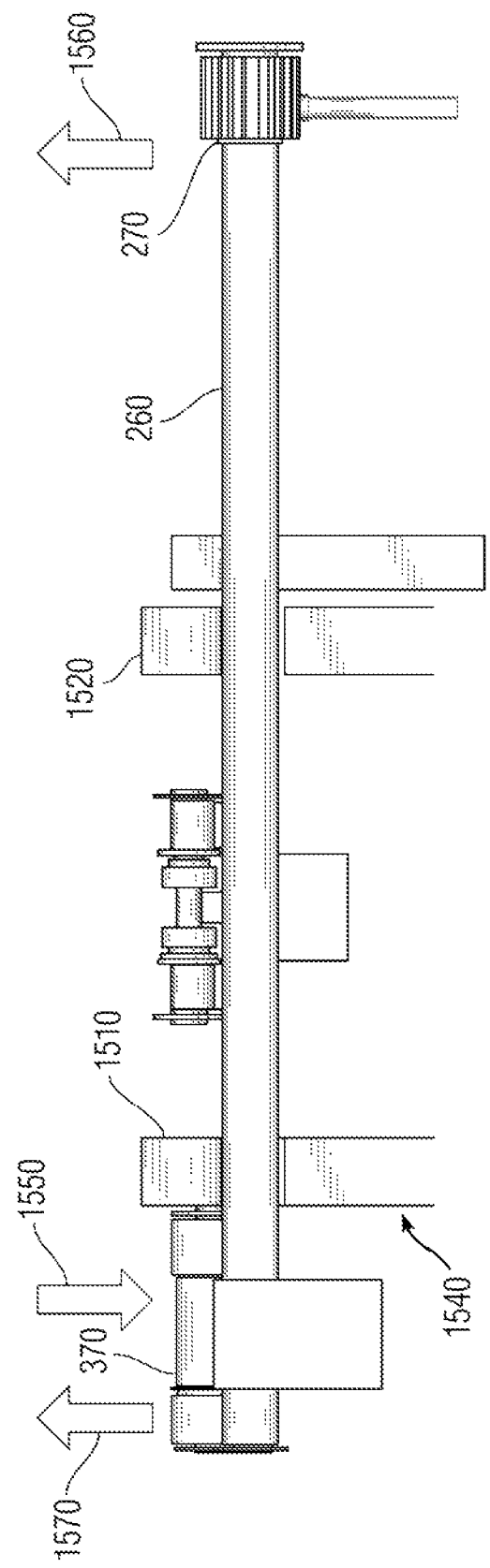
Fig. 15A
Fig. 15B

| GEAR INTERFACE | TAN. FORCE (lbf) | PITCH | GEOMETRY FACTOR | WIDTH (in) | VELOCITY FACTOR | MOUNTING FACTOR | OVERLOAD FACTOR | STRESS (ksi) |
|---|---|---|---|---|---|---|---|---|
| A | 1080 | 12 | 0.35 | 1 | 1 | 1.3 | 1 | 48 137 |
| B1 | 1080 | 12 | 0.22 | 1 | 1 | 1.3 | 1 | 76 582 |
| B2 | 540 | 12 | 0.33 | 1 | 1 | 1.3 | 1 | 25 527 |
| C | 540 | 12 | 0.22 | 1 | 1 | 1.3 | 1 | 38 291 |

| TAN. FORCE (lbf) | PITCH | GEOMETRY FACTOR | WIDTH (in) | VELOCITY FACTOR | MOUNTING FACTOR | OVERLOAD FACTOR | STRESS (ksi) |
|---|---|---|---|---|---|---|---|
| 120 | 12 | 0.17 | 0.25 | 1 | 1.25 | 1 | 56 470 |

| NORMAL FORCE, lbf | PRESSURE ANGLE | LEAD ANGLE | FRICTION COEF. | TOOTH LOAD (WORM GEAR) lbf | TOOTH LOAD (WORM) | EFFICIECY |
|---|---|---|---|---|---|---|
| 120 | 14.5 | 4.766 | 0.005 | 115.7 | 10.24988693 | 0.941271359 |

Fig. 19C

| FATIGUE STRENGTH | GEAR FACE WIDTH | CIRCULAR PITCH | LEWIS FORM FACTOR | WEAR FACTOR | PITCH DIAMETER | MAX ALLOWABLE LOAD (WEAR) | MAX ALLOWABLE LOAD (TOOTH BENDING) |
|---|---|---|---|---|---|---|---|
| 24000 | 0.5 | 0.436158 | 0.1 | 120 | 1.667 | 100.02 | 523.39 |

Fig. 19D

| BEAR LOCATION | BEARING FORCE (lbf) | INTERNAL DIA. (in) | TOTAL BEARING LENGTH (in) | STRESS (psi) |
|---|---|---|---|---|
| A | 1080 | 0.5 | 0.5 | 4320 |
| B | 1451 | 0.375 | 1 | 3869 |
| C | 240 | 0.375 | 0.5 | 1280 |
| D | 260 | 0.5 | 0.75 | 693.3333333 |
| E | 20 | 0.625 | 0.75 | 42.6666667 |

Fig. 19E

HATCH CLAMPING MECHANISM

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to lift assist torsion mechanisms. In particular, the invention relates to lift assist devices for securing hatches used aboard naval vessels.

On ships of the United States Navy, the conventional Mk 46 hatch currently has issues with weather tightness, as well as a lack of electromagnetic interference (EMI) shielding around the hatch. The hatch is vertically aligned and can be difficult to lift open because of its orientation to the operator and absence of mechanical lift assistance. Operational procedures necessitate hatch designs that mitigate against "green water loading" meaning to prevent deck wash from waves or storms from entering ship spaces.

SUMMARY

Conventional hatch cover opening and closing mechanisms yield disadvantages addressed by various exemplary embodiments of the present invention. In particular, exemplary embodiments provide a lift assist mechanism for opening and closing a hatch cover. Other various embodiments alternatively or additionally provide for ease of installation in a frame having loose tolerance while displacing a small volume for sundry mechanisms.

In particular, exemplary embodiments provide a lift assist mechanism for positioning a hatch cover in relation to a corresponding opening in a hatch frame. The assist mechanism includes a torsion bar and a lifting mechanism. The torsion bar has first and second opposite ends. The first end secures to the hatch frame. The second end connects to a bar spur gear. The lifting assembly includes a lift spur gear and a hinge gear. The lift spur gear engages the bar spur gear. The gears convert an acute angle twist of the bar to substantially perpendicular pivot the hatch cover from the hatch frame.

Other exemplary embodiments provide a locking mechanism for releaseably securing the hatch cover to its opening. The locking mechanism includes a central hub and a plurality of armatures. The central hub is disposed on the hatch cover and includes a worm gear and a plurality of sprockets that rotate in response to the worm gear. The armatures correspond to the sprockets in quantity. Each armature includes a rotating dog-lock disposed adjacent a rim on the hatch cover and a corresponding shaft that rotatably connects a sprocket to the dog-lock. The dog-lock includes a latch. In response to rotation by the worm gear, this latch pivots between a locking position that engages the hatch frame and a release position.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 14A through 14D are elevation views of the pawl assembly;
FIGS. 15A and 15B are elevation views of a torsion bar;
FIG. 18 is a graphical view of lift forces over angle;
and
FIGS. 19A through 19E are tabular views of quantitative parameters.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1A:
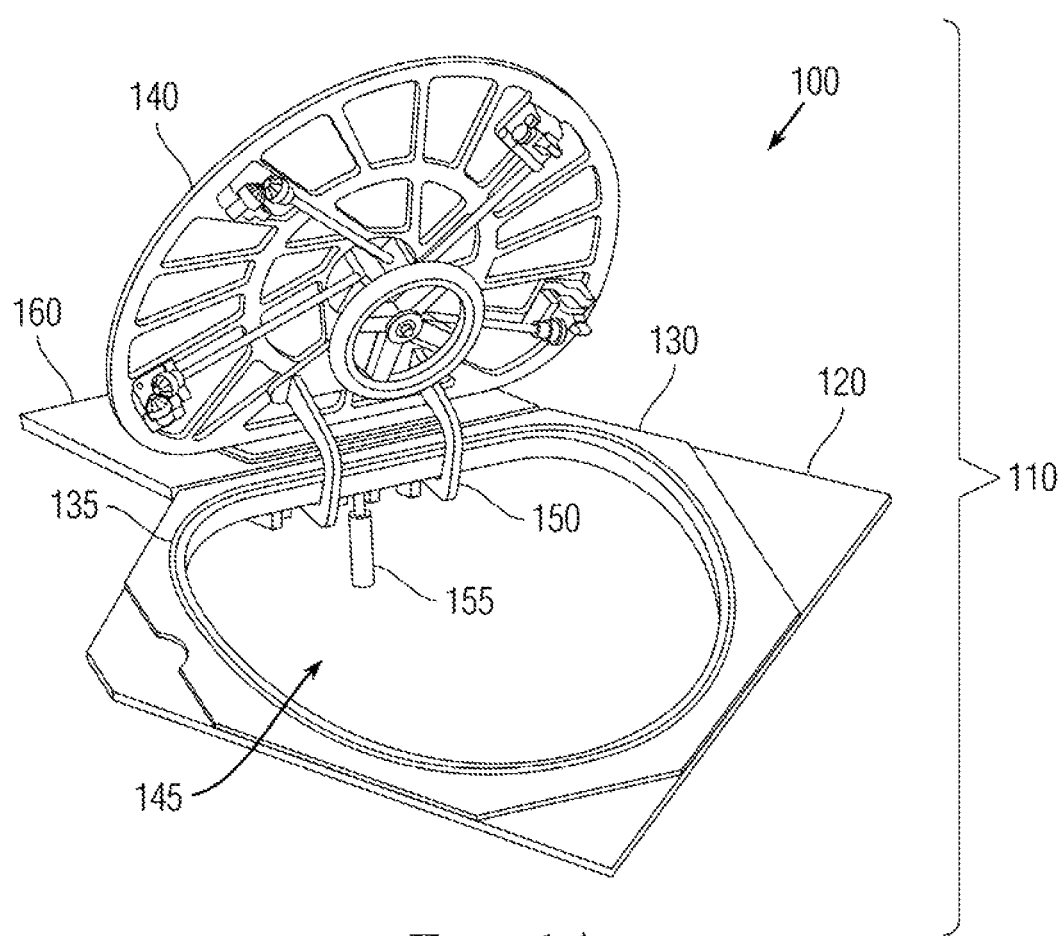
FIGS. 1A and 1B are isometric views of a hatch assembly.

FIG. 1A shows a perspective view 100 of an exemplary hatch assembly 110 in an open configuration on a first hatch interface surface 120. Components include a hatch interface frame 130, gasket rim 135 to seal against weather and a cover lid 140 revealing a hatch opening 145. A pair of hatch cover arms 150 and a pull lever 155 are secured on the underside of a second hatch interface surface 160.

Figure 1B:
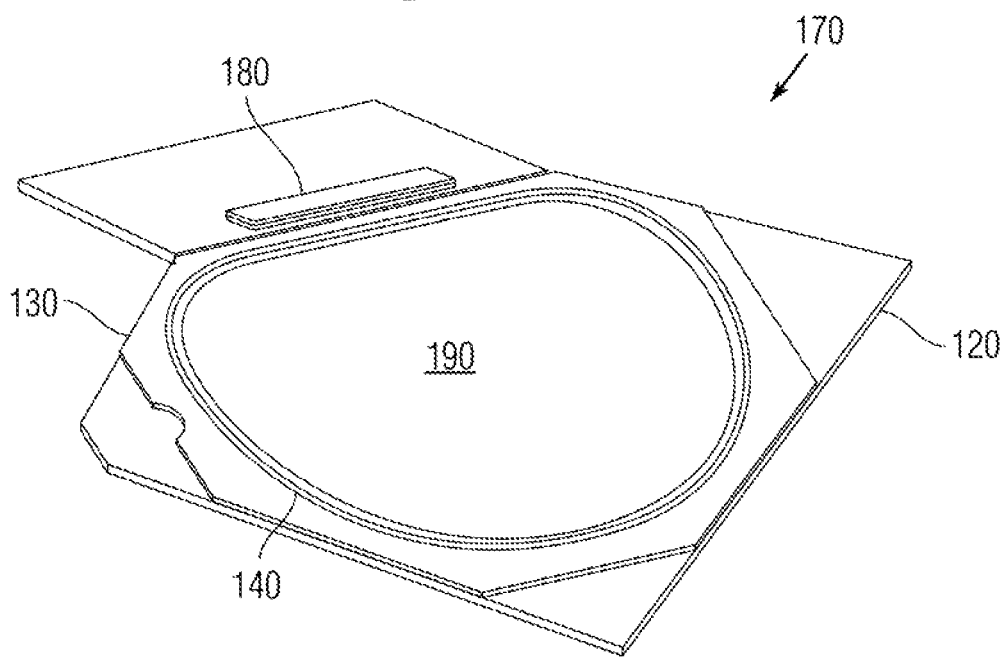
Figure 2:
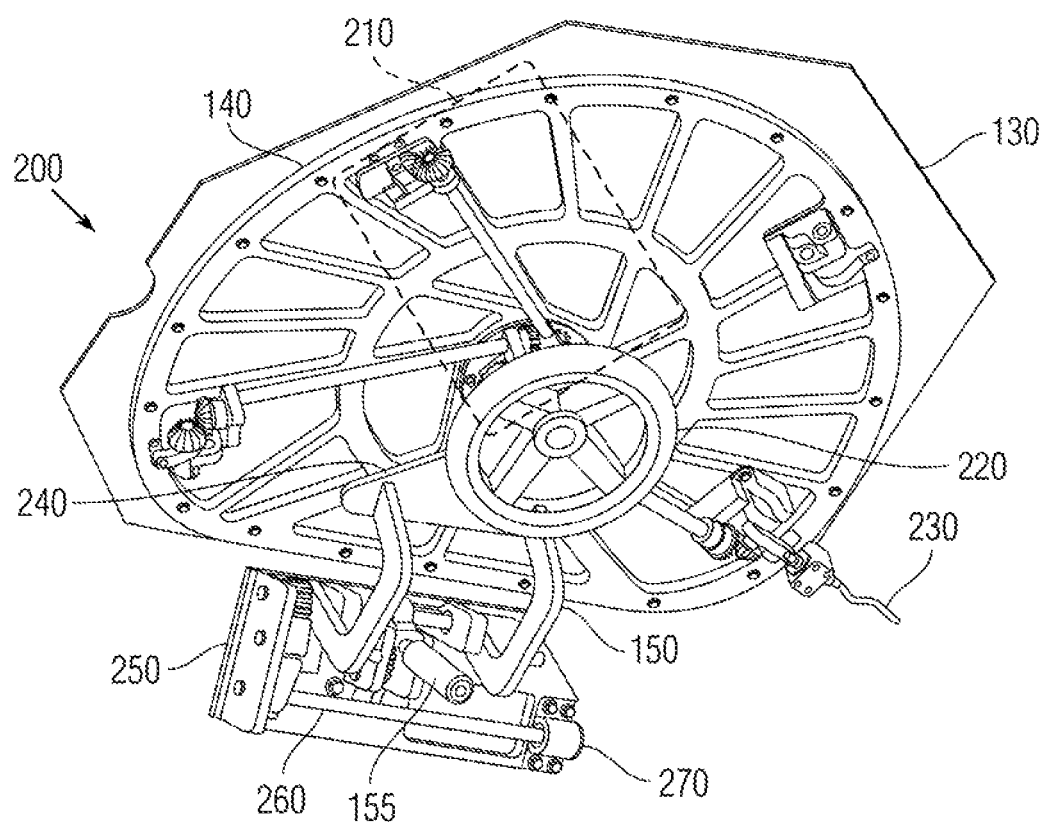
FIG. 2 is an isometric view of the hatch assembly.

FIG. 1B shows a perspective view 170 of the hatch assembly in a closed configuration. Components include a hatch mount backing 180 with threaded holes for mounting bolts along with a weather seal, and an outer surface 190 of the lid 140. FIG. 2 shows a perspective view 200 of the hatch assembly. Components include an armature assembly 210 for torque reduction, an annular hand crank 220, a hatch closure sensor cable 230, a triangular hatch cover arm bracket 240, a hinge assembly base frame 250, a torsion bar 260 and a torsion bracket 270.

Figure 3:
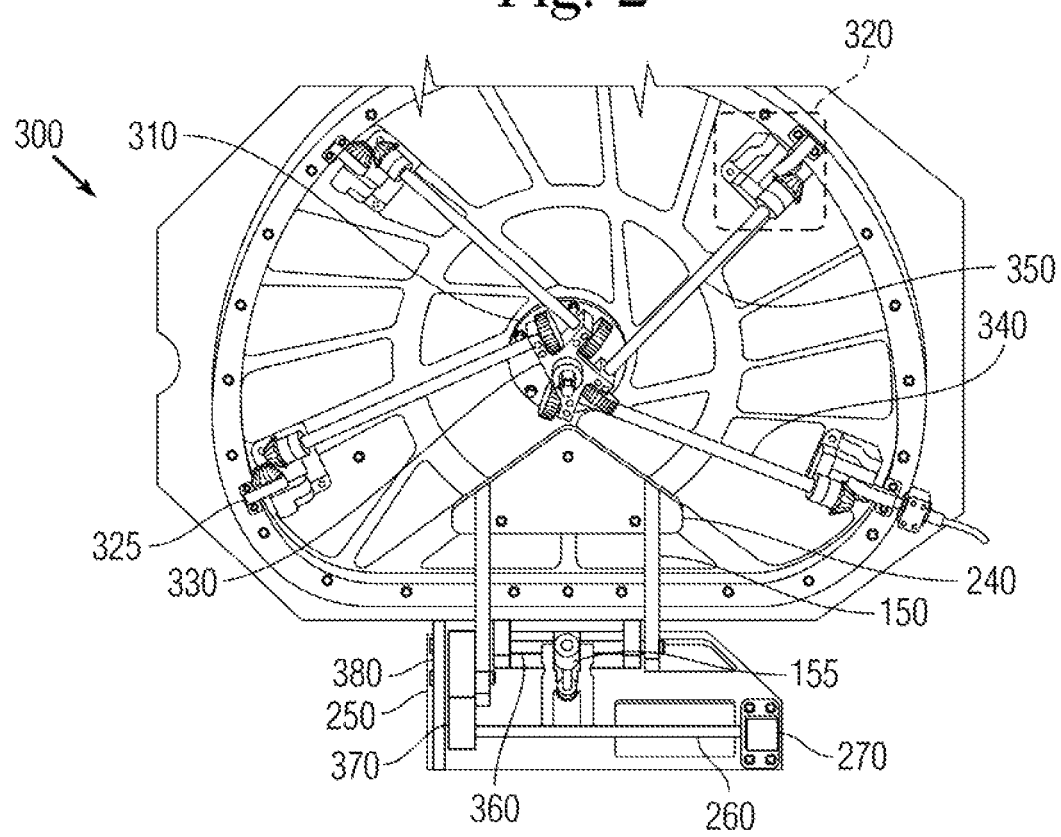
FIG. 3 is a plan view of the hatch assembly.

FIG. 3 shows a perspective view 300 of interior hatch components. Components include a worm-to-worm-gear assembly hub 310 and a plurality of rotating dog-locks 320 (a set of four for this embodiment) adjacent the rim of the hatch cover 140. Each dog-lock 320 has a lip latch 325. The hub 310 includes a plurality of worm wheel brackets 330 for a worm gear crank. Two proximal rods 340 and two distal rods 350 connect the hub 310 to the separate dog-locks 320.

For the embodiment shown, the proximal rods 340 are slightly longer than the distal rods 350.

The cover lid 140 secures to the flange 130 by the lip latches 325 when closed. The cover lip 140 opens via the cover arms 150, which connect to the base frame 250 by a hinge shaft 360. In addition to the torsion bar 260 secured by its bracket 270, the base frame 250 includes a cam arc spur gear 370 that attaches to the torsion bar 260 and a double-radial spur gear 380 that attaches to the hinge shaft 360.

Figure 4:
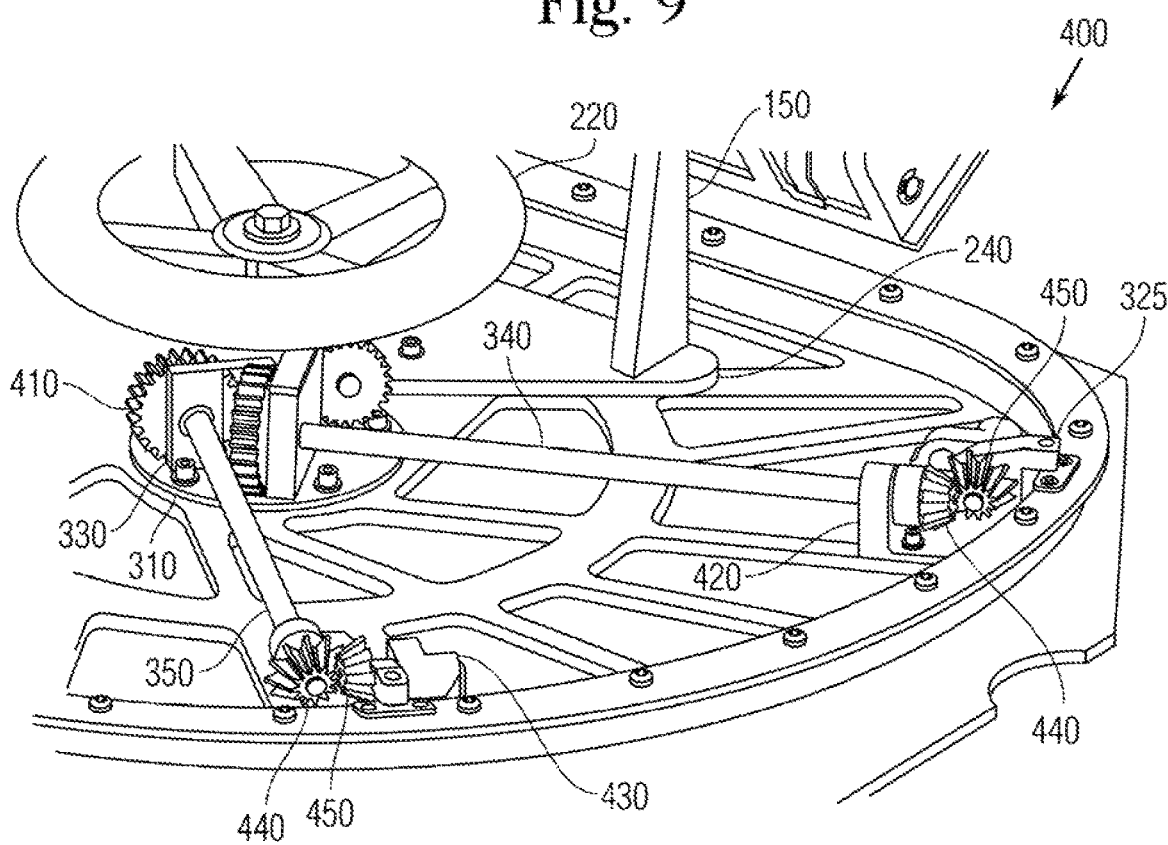
FIG. 4 is an isometric view of dogging mechanisms.

FIG. 4 shows a perspective detail view 400 of the hatch engage assembly including the worm hub 310 and the dog-locks 320. The dog-locks 320 and their connecting mechanisms form a plurality of armature assemblies or toggles. The worm hub 310, includes the plurality of worm wheel brackets 330 that align radially, together with a corresponding plurality of worm wheel gears or sprockets 410. Each worm gear 410 rotates on an axis perpendicular to the corresponding bracket 330. The exemplary embodiments illustrate four each for the brackets 330 and gears 410.

Each dog-lock 320 includes a radial bracket 420, a tangent bracket 430 associated with its, corresponding latch 325, as well as first and second miter bevel gears 440 and 450. Each first bevel gear 440 connects to one of the rods 340 and 350 adjacent the rim of the hatch cover 140 opposite its associated worm wheel gear 410. Each second bevel gear 450 connects to its corresponding latch 325 and engages its corresponding first bevel gear 440 for rotating the latch 325 to either release the hatch cover 140 or secure it to the frame 130.

Thus, the proximal and distal armature rods 340 and 350 transmit torque from the worm hub 310 to their corresponding dog-locks 320 for rotating the latches 325. The proximal armature rods 340 are slightly longer than the distal armature rods 350 for this illustrated embodiment, although this aspect reflects the geometry of the hatch cover 140 and is not limiting.

Figure 5:
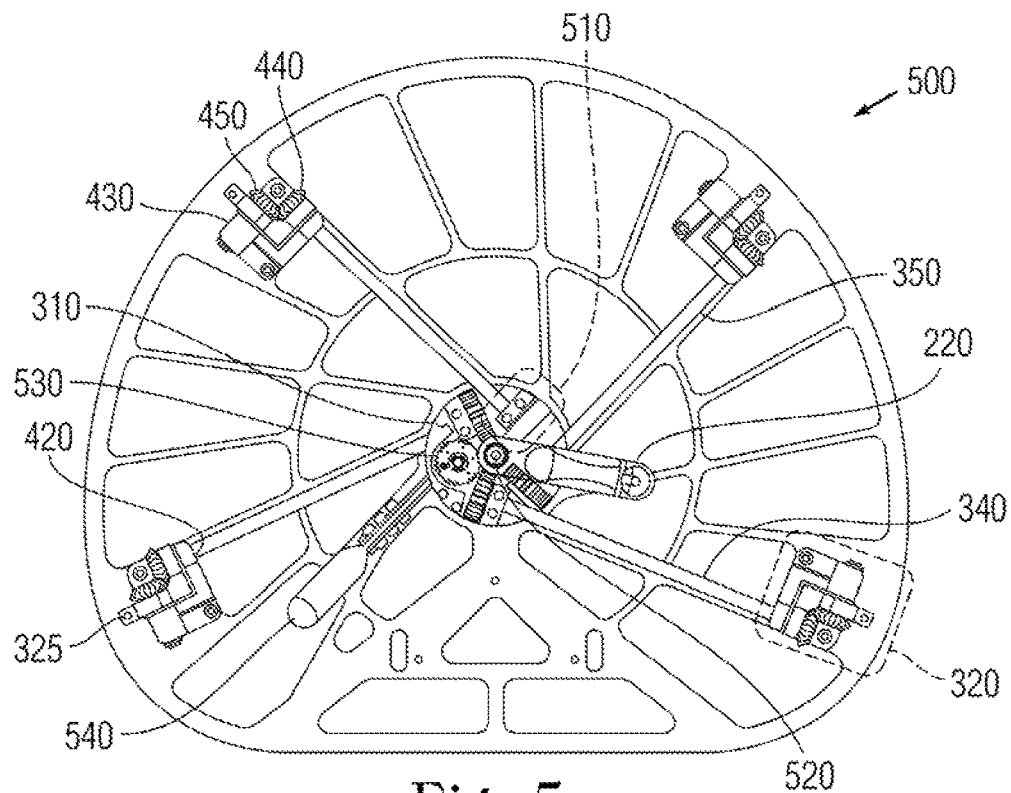
FIG. 5 is an isometric view of the hatch assembly.

FIG. 5 shows a plan view 500 of the hatch cover 140 showing the worm hub 310 with four force-assist assemblies radiating therefrom, including the dog-locks 320 and their corresponding rods 340 and 350. Central worm gear assemblies 510 attach to the worm hub 310. Each worm gear assembly 510 includes the bracket 330 and its corresponding worm gear 410.

A driver wheel 520 rotates with the hand crank 220. An alignment driven wheel 530 sets the number of turns for locking the hatch cover 140 into either the full-open or closed position in response to rotation from the driver wheel 520. The peripheral bevel gear dog assemblies 320 attach to the hatch cover 140 near the rim's periphery. Each bevel gear assembly 320 includes the lip latch 325, the radial bracket 420, the tangent bracket 430, along with first and second miter bevel gears 440 and 450. The armature rods 340 and 350 connect each associated pair of gear assemblies 510 and 320. The hand crank 220 enables the worm hub 310 to be turned via the driver wheel 520 and the driven wheel 530. A handle 540 unlocks pawls on the worm hub 310 so the hatch cover 140 can be dogged or undogged by respectively extending or retracting the latches 325.

Figure 6:
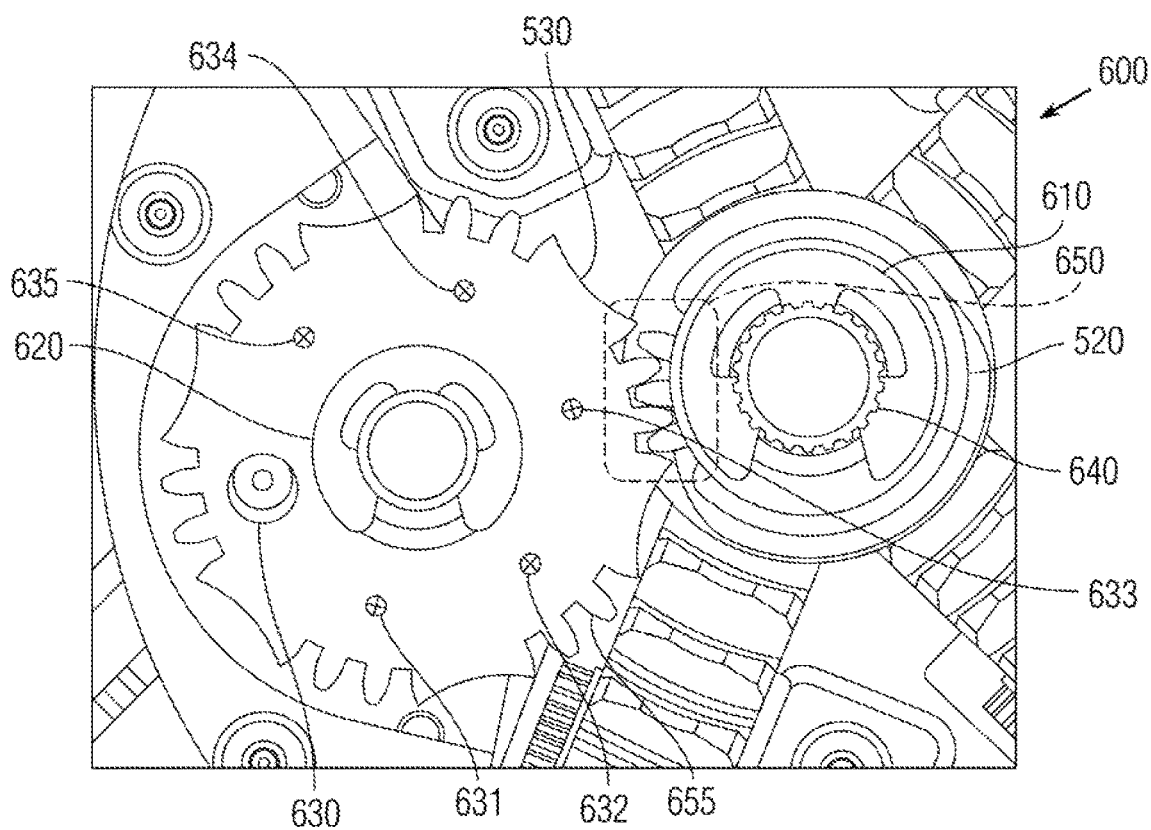
FIG. 6 is an isometric view of a lift mechanism.

FIG. 6 shows a perspective detail view 600 of an intermitted motion mechanism on the worm hub 310, including driver and driven wheels 520 and 530. These wheels are axially held by respective snap rings 610 and 620. The driven wheel 530 of the intermitted motion mechanism includes a spring loaded pin 630 that aligns to a hole that turns 60° anti-clockwise for each complete rotation of the hand crank 220. The hole on the driven wheel 530 attains successive angular positions until the pin 630 can align and insert therein: first 631, second 632, third 633, fourth 634, and fifth 635 before returning to its original position. The driver wheel 520 has an involute spline 640 engages the driven wheel 530 at an intermittent interface 650 via engaging teeth 655.

Figure 7:
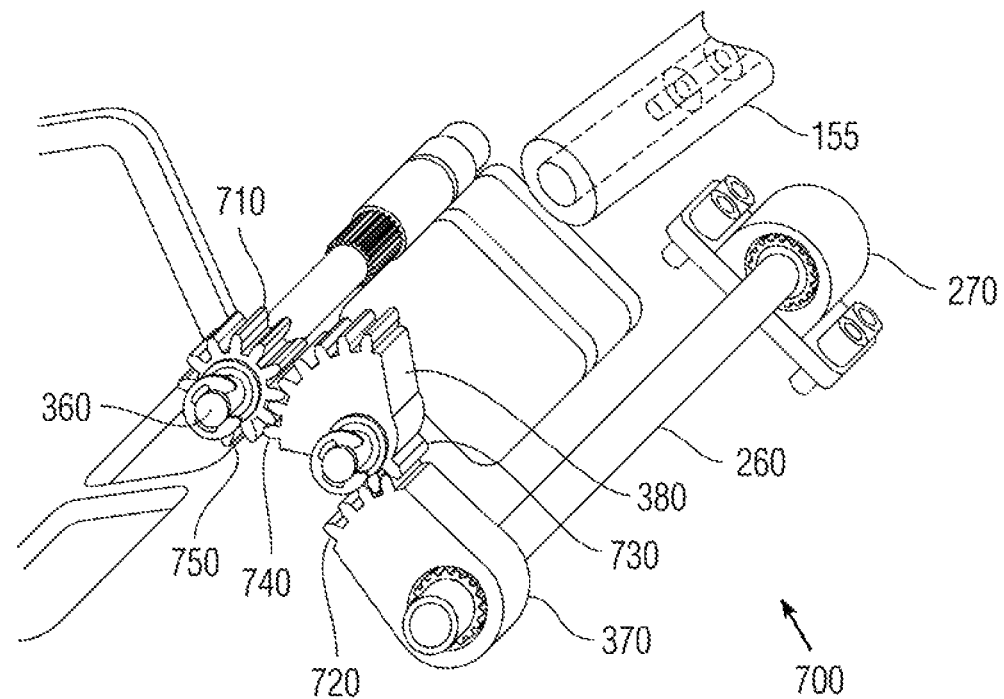
FIG. 7 is an elevation view of gears of the lift mechanism.

FIG. 7 shows a perspective detail view 700 of the lifting gear mechanism mounted to the base frame 250 shown in view 300 while also including a circumferential spur hinge gear 710. The hinge shaft 360 includes plural diameters with involute spline patterns to enable torque transmission from the end of the armature assembly 210 to the hatch cover arms 150 and secured by a pair of retaining clips (shown in view 1200).

Components include the first spur gear 370, the second spur gear 380 with two partial-circumference pitch diameters, and the hinge gear 710 on the hinge shaft 360. The first spur gear 370 includes cam spur teeth 720. The second spur gear 380 includes two pitch diameters with partial arc circumference. The smaller radius includes spur teeth 730 that engage the spur teeth 720 of the first spur gear 370. The larger radius includes spur teeth 740 that engage circumferential spur teeth 750 of the hinge gear 710 that rotates the hinge shaft 360.

The first spur gear 370 has 3:1 gear ratio from the torsion bar 260. The second spur gear 380 has a 2:1 gear ratio from the first spur gear 370. Together, these provide a low-profile 6:1 conversion, thereby translating 15° twist of the torsion bar 260 at 240 ft-lb to enable swinging 90° pivot on the hinge shaft 360 at 20 ft-lb to ease lift of the hatch cover 140 from the frame 130. Artisans of ordinary skill will recognize that alternative gear geometries could similarly achieve a substantially perpendicular hinge movement from an acute angular twist of a torsion bar.

Figure 8:
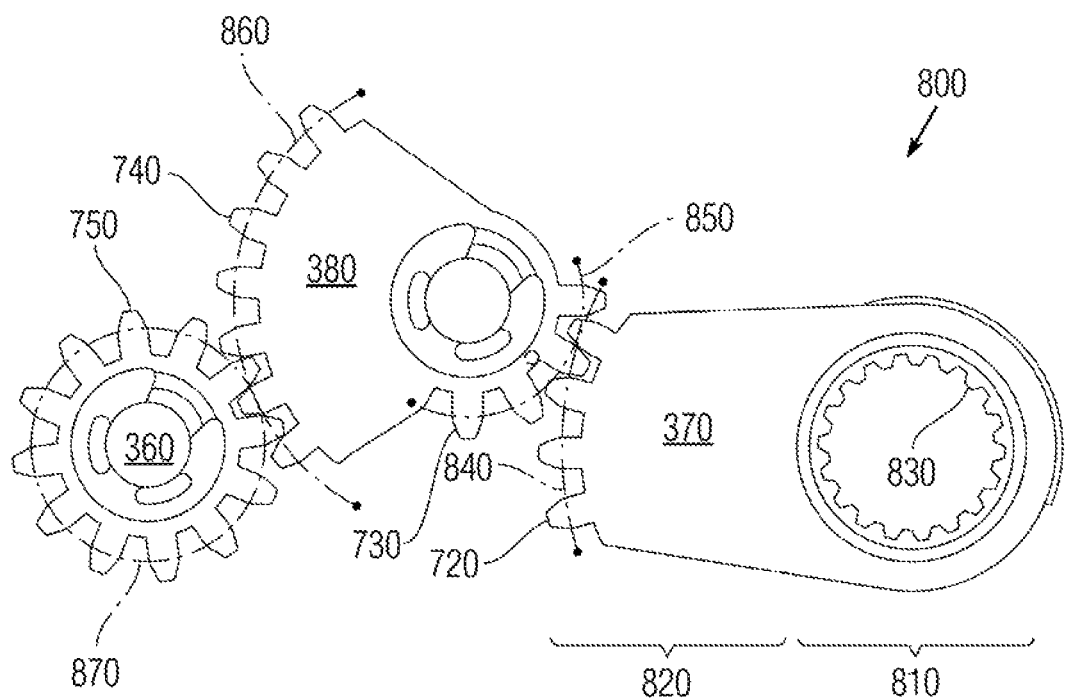
FIG. 8 is an elevation view of motions of the gears.
Figure 10A:
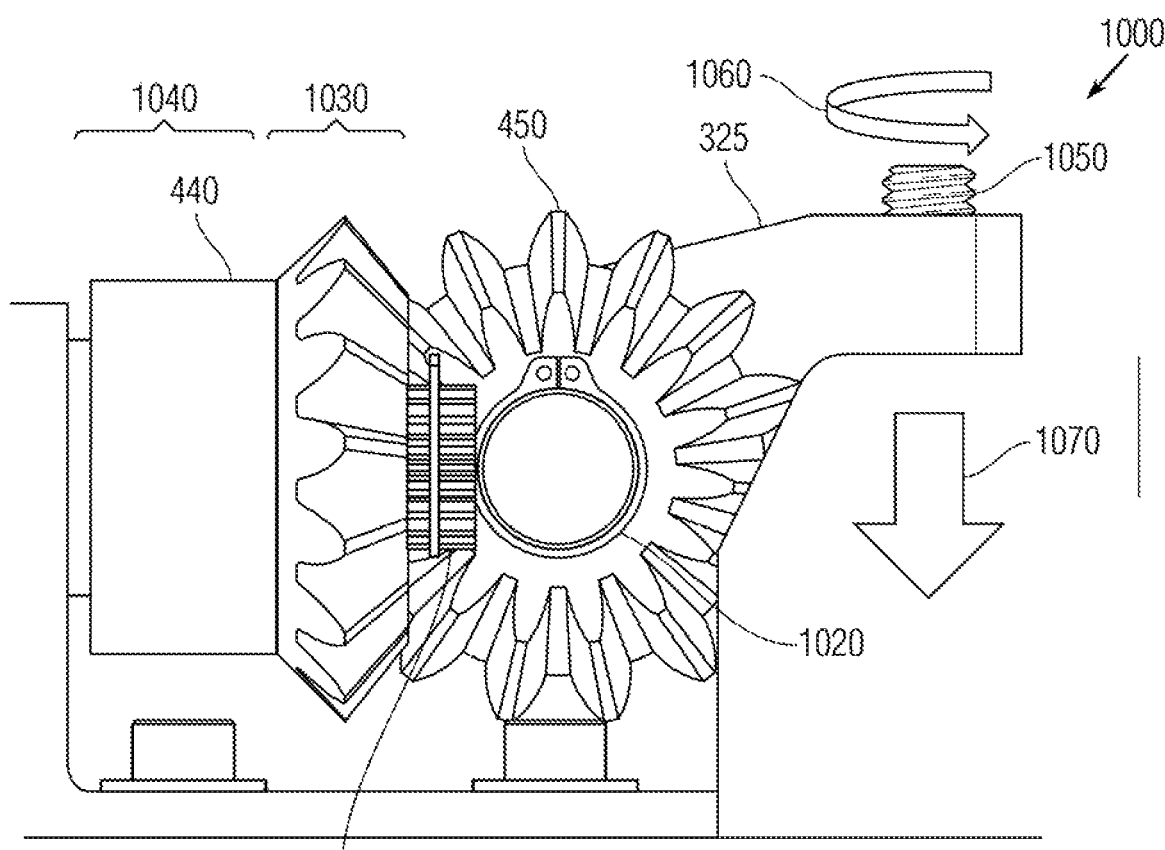
FIGS. 10A through 10D are detailed views of the dog mechanism in operation.
Figure 10B:
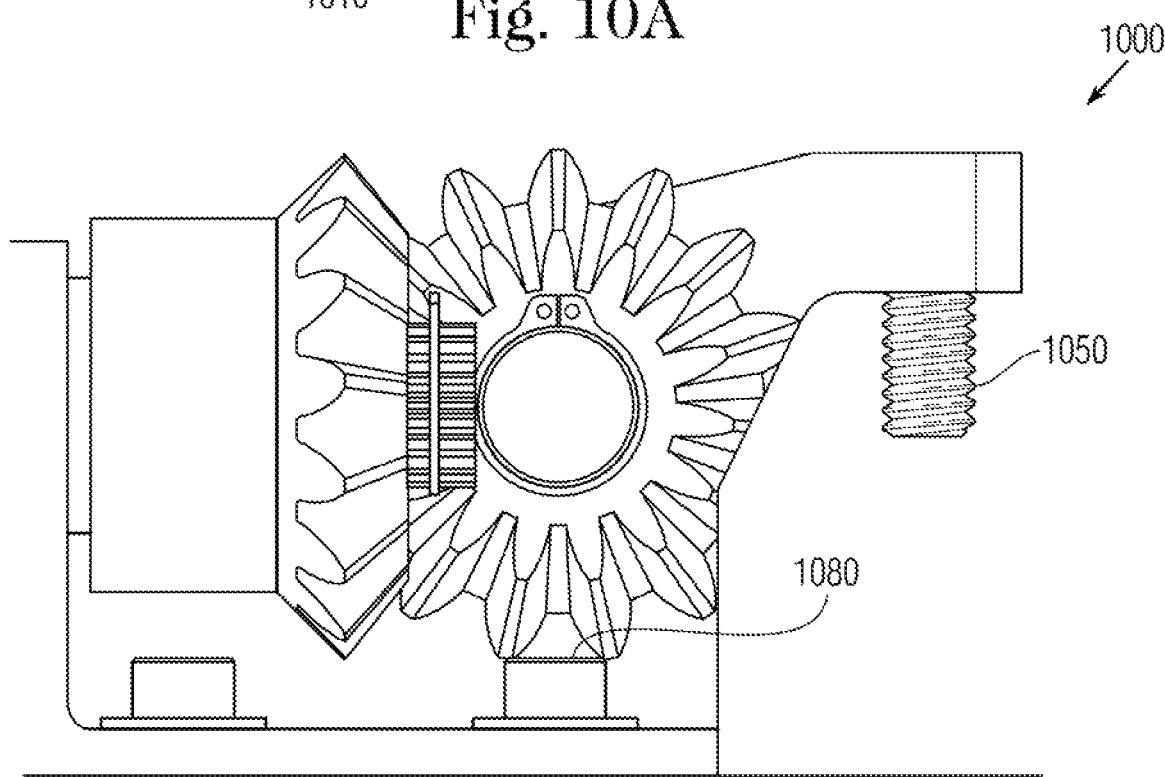
Figure 10C:
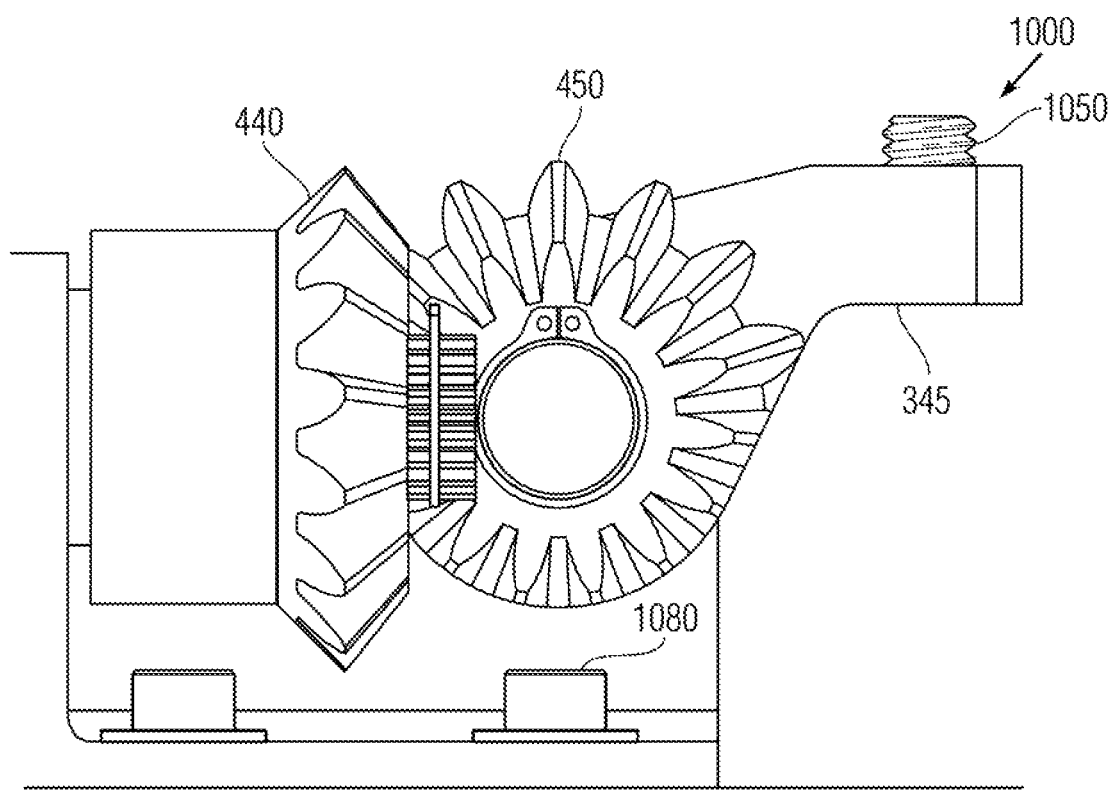
Figure 10D:
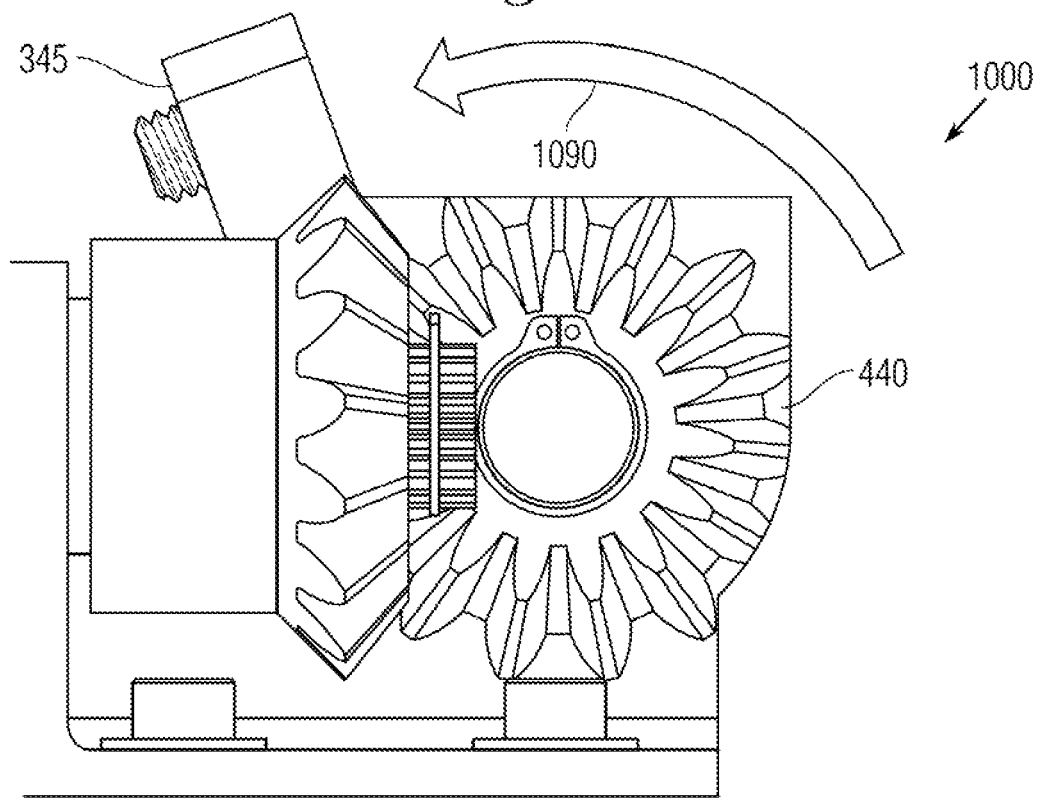

FIG. 8 shows an elevation view 800 of the lifting gear mechanism. The first spur gear 370 on the torsion bar 260 includes a conventional annular rotating member 810 and the external gear cam 820. The member 810 includes an inner periphery with teeth 830 on the internal involute spline to engage the torsion bar 260. The cam 820 has a radius of 1.5 inches and teeth 710 to engage counterpart proximal teeth 720 of for second spur gear 380 (with smaller spur pitch diameter). The second spur gear 380 also has distal teeth 730 (with larger spur pitch diameter) that engage the circumferential spur teeth 750 on the hinge gear 710.

The first spur gear 370 pivots across an arc of motion 840 by teeth 720. The second spur gear 380 pivots across smaller pitch arc of motion 850 by teeth 730, translating to larger pitch arc of motion 860 by teeth 740. The hinge gear 710 pivots across arc of motion 870 by circumferential teeth 750 from engagement with the arc of motion 860 of the second spur gear 380. The gear teeth 750 include an internal involute spline similar to teeth 720, 730 and 740.

The torsion bar 260 is provided with the gear train formed by spur gears 370, 380 and 710 enables the mechanism assembly to exhibit a low profile. A direct attachment of an alternative torsion spring would be much simpler mechanically, but this would also raise the hinge point of the hatch cover 130 from the current 0.875 inch to at least three inches from the working surface 120. This changes the sweeping arc of the hatch body to an undesirable path. Additionally, the larger footprint of a torsion spring occupies the operator area, and thus could constitute a head-bumping safety hazard for ship crew members.

Figure 9:
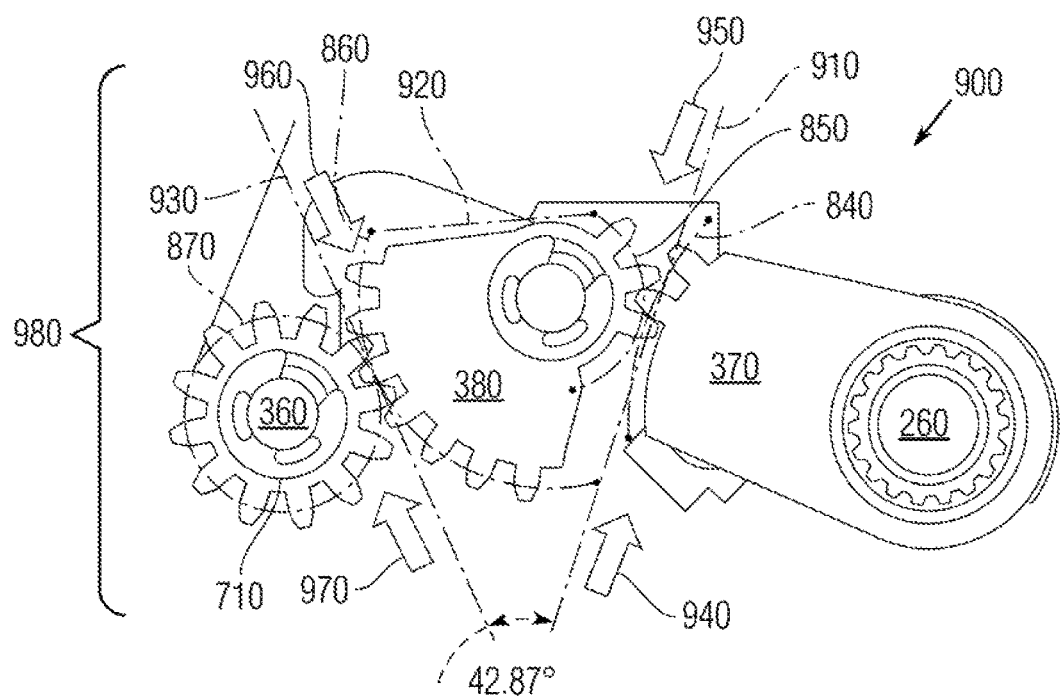
FIG. 9 is an isometric view of a detail of the hatch cover.

FIG. 9 shows an elevation view 900 of the lifting gear mechanism showing force vectors based on view 800. An interface tangent 910 denotes the intersection between arcs 840 and 850 of respective spur gears 370 and 380. A branch line 920 denotes an intersection between arcs 850 and 860 between sections of the second spur gear 380. An interface tangent 930 denotes the intersection between arcs 860 and 870 of respective spur and hinge gears 370 and 710.

Alignment between lines 910 and 930 forms acute angle of 42.87° therebetween. Along the tangent line 910, the first spur gear 370 exhibits an upward reaction force 940, and the second spur gear 380 exhibits a downward reaction force 950. Along the tangent line 930, the second spur gear 380 exhibits a downward reaction force 960, and the hinge gear 710 exhibits an upward reaction force 970. This lift assist mechanism 980 enables lifting the hatch cover 140 into the open position from the frame 130.

FIGS. 10A through 10D show elevation views 1000 of the distal bevel assembly 520 with the miter bevel gears 440 and 450, with the rotation of the latch 325. The involute spline 1010 of the armature rod 340 or 350 applies torque to the bevel gear 440 while fixing it along its axis, and the hinge pin 1020 fixes the bevel gear 450 upon its axis. The first bevel gear 440 includes a bevel tooth portion 1030 and a shoulder collar 1040 that secures to its radial bracket 420 so as to rotate.

A helical set screw 1050 through the latch 325 can be rotated clockwise 1060 to execute a downward motion 1070 to secure the hatch cover 140 to the frame 130. A bolt 1080 attaches the bevel assembly 320 to the hatch cover 140. Turning the second bevel gear 450 rotates the latch 325 anti-clockwise 1090 for releasing the hatch cover 140 from the frame 130. The depth of the set screw 1050 within the latch 325 is adjustable so as to enable a specified preload torque to be applied when the hatch cover 140 abuts against the frame 130.

Figures 11, 12:
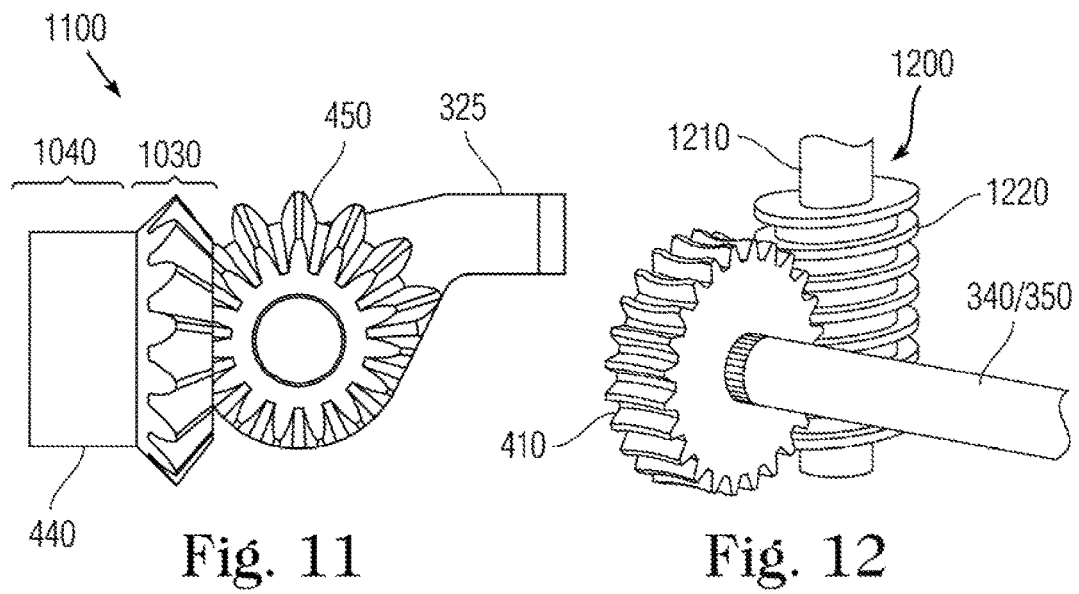
FIG. 11 is an elevation view of bevel gears.
FIG. 12 is an isometric view of a worm gear.

FIG. 11 shows an elevation view 1100 of the distal bevel gear assembly 320 associated with the latch 325 so as to adjust the gap between the hatch cover 140 and the frame 130. This sealing gap can vary around the periphery of the hatch cover 140, and must be compensated for in order for the gasket 135 to provide a water-tight seal while maintaining uniform tension. The first bevel gear 440 includes a miter gear shoulder 1040 and miter teeth portion 1030. These miter teeth engage perpendicular teeth of the second bevel gear 450 connected to the latch 325.

FIG. 12 shows a perspective assembly view 1200 of the proximal worm gear assembly 510 associated with the worm hub 310. A central shaft 1210 coaxial with the driver wheel 520 turns with the hand crank 220. A helical worm gear 1220 coaxial to the shaft 1210 engages the worm wheel 410 attached to its associated armature rod 340 or 350. The helical spline of the worm gear 1220 meshes with the spur gears of the worm wheel 410.

The novelty of the miter gear assembly 520 includes the set screw 1050 to apply pressure to the hatch interface frame 130 that provides weather sealing on the gasket 135 for the hatch cover 140. Torque and linear forces on the connecting bolts and set screws clamp the hatch cover 140 to the gasket 135, and the set screw 1050 can be tightened with a torque wrench. This enables for variations in the mounting of the hatch cover 140 and flatness of the mounting surface 120 while maintaining precise clamping force.

Figure 13:
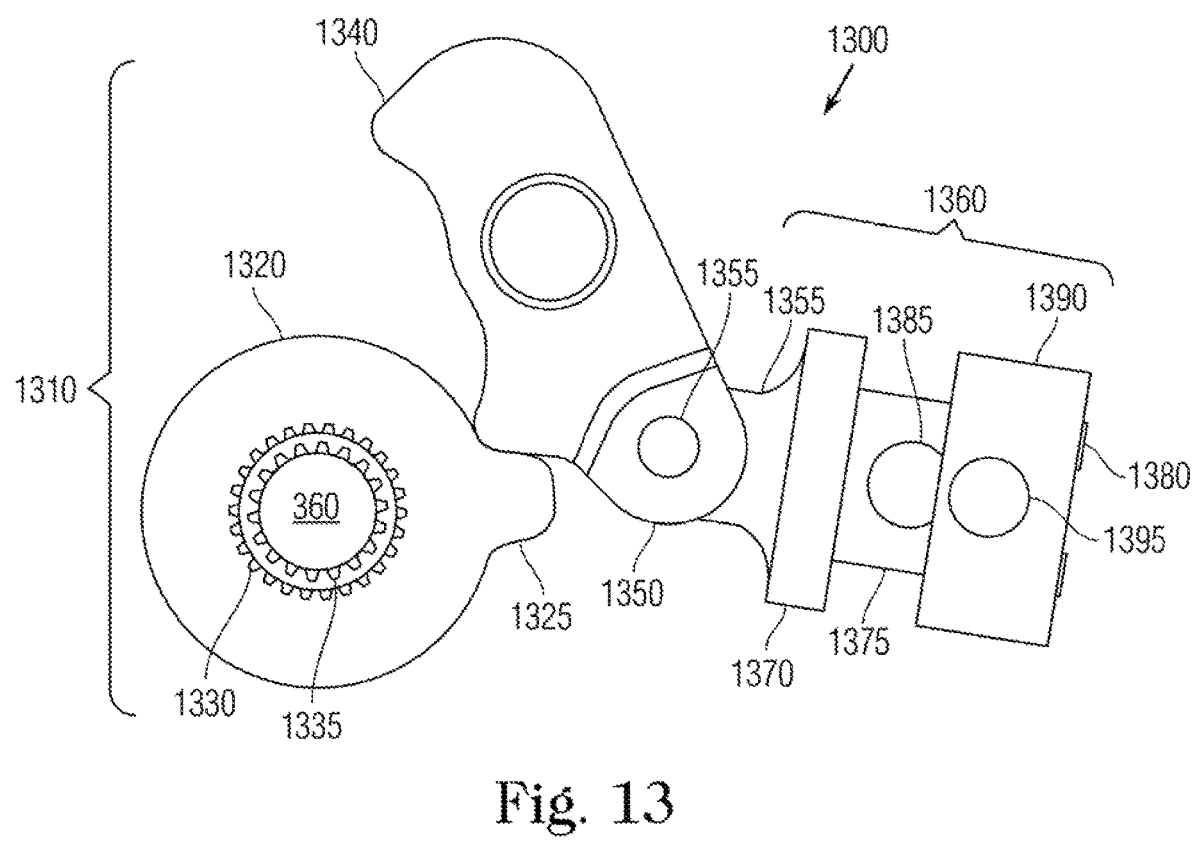
FIG. 13 is an elevation view of a pawl assembly.

FIG. 13 shows an elevation assembly view 1300 of an exemplary hinge lock assembly 1310 that connects to the pull lever 155 to move the hatch cover 140 from the hatch frame 130. Components include a dual direction pawl stop ratchet 1320 mounted to the hinge shaft 360, with a peripheral cam 1325, and involute splines 1330 and 1335. The cam 1325 raises or lowers an engaging surface on a dual directional pawl 1340 that rotates along an axis common with a pawl hinge pin 1345 and pivots along a spring plunger pawl 1350 with a pawl pin 1355 that protrudes through a pivot hole. The motion linearly translates a spring yoke 1360 comprising several integrated components. This includes a plunger 1365 with spring shoulder 1370 that connects to a fork 1375 between a pair of legs 1380 separated by a gap 1385. The legs 1380 operate within a spring stop 1390 that includes a transverse hinge pin 1395.

The yoke 1360 pushes the pawl 1340 to either open or closed locked positions. The yoke 1360 locks the ratchet 1320 that connects the hinge shaft 360, which connects to the arms 150. The yoke 1360 does not interact with the arms 150 and does not provide torque, but rather facilitates locking either the raised or lowered positions of the cover hatch 140. The torsion bar 260 generates the lift-assist torque, transmitted through the spur gears 370, 380, 710 and transmitted to the arms 150 via the hinge shaft 360.

FIGS. 14A, 148, 14C and 140 show elevation assembly views 1400 of the hinge lock assembly 1310 in select phases of motion. These phases include a first start stroke 1410, a second stroke 1420, a third stroke 1430, and a fourth stroke 1440. In the first stroke 1410, the hatch cover 140 is in the down position and the pawl 1350 in the locked open position. In the second stroke 1420, the pawl 1350 rides over the ratchet 1320, extending the legs 1380 of the yoke 1360 farther into the stop 1390. In the third stroke 1430, the crest of the pawl cam 1325 passes over the ratchet 1320. In the fourth stroke 1440, the pawl 1350 falls behind the ratchet 1320, at which the hatch cover 140 opens, and the pawl 1350 is in the locked open position. Components include sliding surface 1450 of the ratchet 1320.

FIG. 15A shows an elevation view 1500 of the hinge shaft 360.

Components include mounts 1510 and 1520 connecting the lift arms 150 to the hinge assembly base frame 250 with the lift assist 1310 disposed therebetween and anchored by a hinge bracket 1530. FIG. 15B shows an elevation view 1540 of the torsion bar 260 with reaction force 1550 on the torsion bar base 270, as well as reaction forces 1560 and 1570 on the miter gear 710.

Torque to the set screw 1050 translates to clamping force on the hatch hinge. The set screw 1050 can absorb variation in the mounting plane height (upon installation) because the set screw 1050 extends until reaching the surface of the frame 130, and can then sustain torque and normal force. Normal force is prescribed by a torque wrench. The hand crank 220 attached to the worm gear assembly 510 is a 20:1 gear ratio. Minimal torque required until pawls are engaged with frame 130: approximately 20 in-lbs upon locking. The four pawl locations require four worm wheels 410 tied to the same worm gear 1220. This requires that the worm wheels 410 be clocked by differently to their respective splines.

The rotational dog-lock 320 enables the 1:1 miter gear set to change rotation axis by 90°. Thus, moment of 20 in-lbs at the pull handle 155 converts to 100 pounds compression at four locations concurrently. Because of a 20:1 gear ratio on the worm hub 310, approximately six turns of the hand crank 220 are needed to pull the pawl 345 out of locking position, which is 108°. The hand crank 220 unloads until the very last portion of the turning, so as to easily rotate until the last quarter turn. Upon alignment between the pin 630 and angularly spaced holes on the driven wheel 530, the hand wheel 220 locks at zero and six turns.

Intermittent motion mechanism utilizing the driver wheel 620 and the driven wheel 530 employ gear teeth to transmit torque, but only at whole number rotations of the driver gear 520. When the driven wheel 530 aligns with a spring loaded pin 630, the driven wheel 530 locks until an operator releases the pin 630. The advantage for the described embodiments is that using a conventional gear necessitates at least a 6:1 gear ratio, which necessitates the follower gear to be three times larger than the exemplary mechanism.

Figures 16, 17:
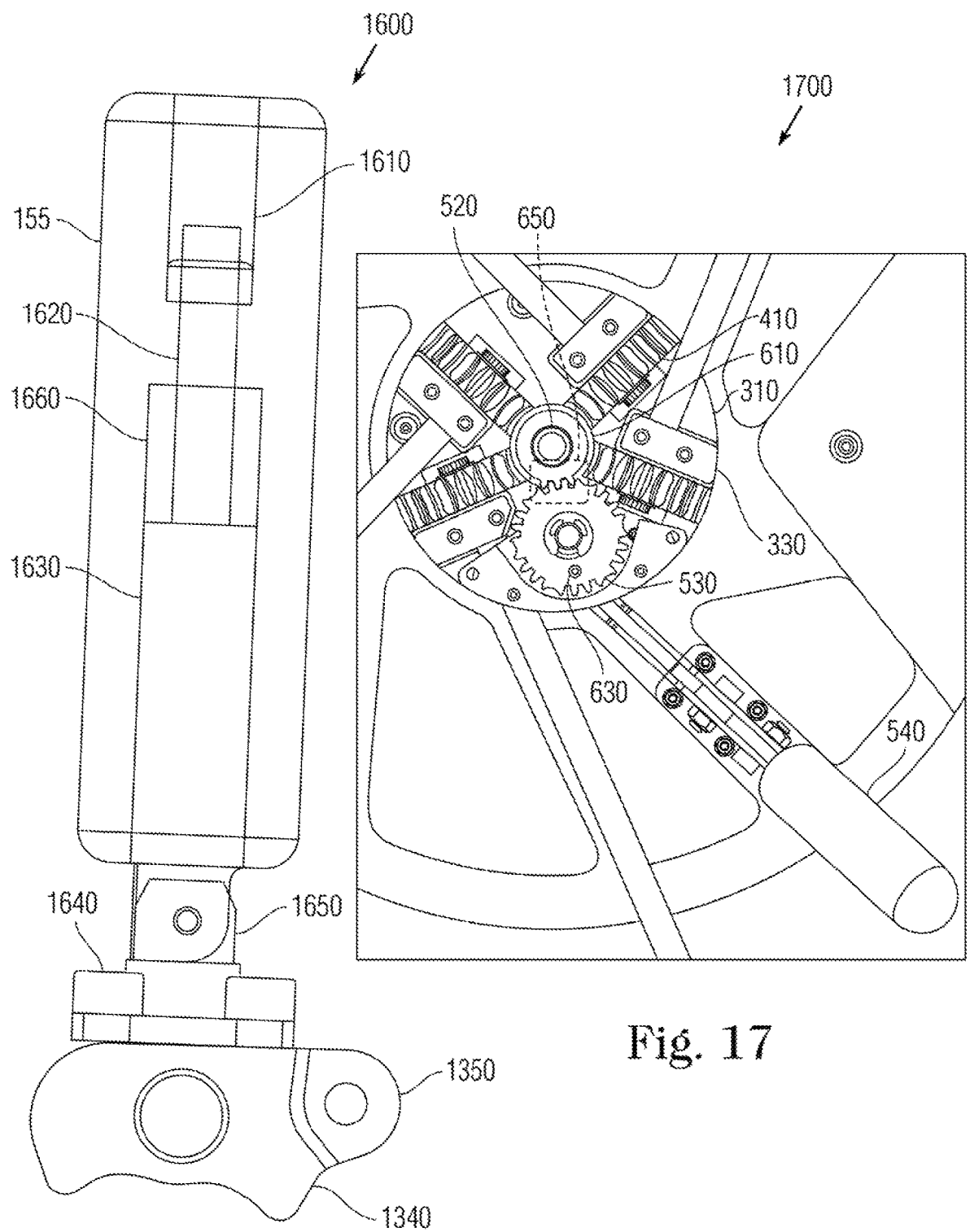
FIG. 16 is an elevation view of a handle section.
FIG. 17 is an isometric view of a detail view of the lift mechanism.

FIG. 16 shows an elevation assembly view 1600 of the locking mechanism for the pull handle 155. Components include clearance gap 1610 for the head of the shoulder bolt 1620, the handle guide shaft 1630, the bolt head 1640 and the handle 1650 to the pawl interface that the bolt head 1640 secures, connected together by a hinge pin. The handle 1650 abuts adjacent a flat side of the pawl 1330. A helical spring 1660 provides compressive force between the bolt 1260 and the shaft 1630.

FIG. 17 shows a perspective detail view 1700 of the rotational dog lock of the hatch assembly 110. A hand wheel shaft 1710 for the spline 640 centers the worm hub 310 that turns by the torque lever 530. Components for intermittent motion include a driver gear 620 and the driven gear 610 joined by teeth at their interface 650, and a locking pin at the hole 630. The driven gear 610 includes with spur gear teeth 655 on the periphery.

Figures 18, 19A, 19B:
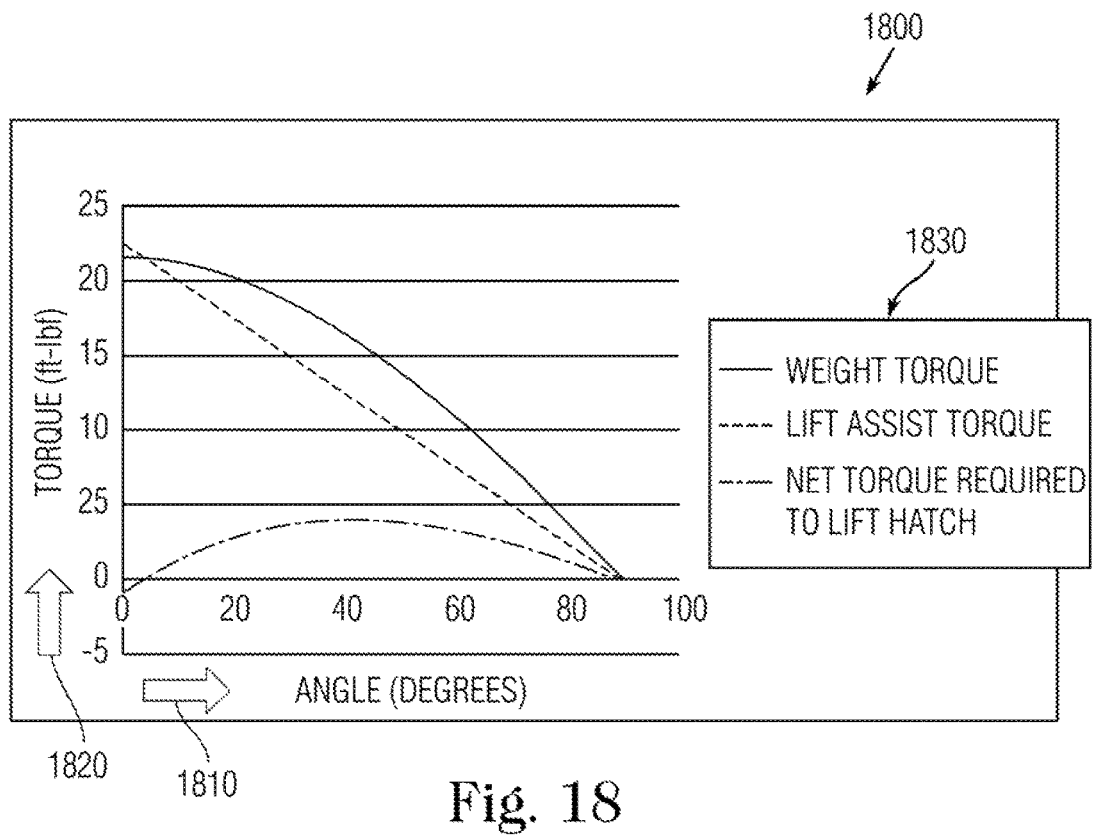

FIG. 18 shows a graphical view 1800 of torque variation with angle. Angle setting 1810 (degrees) represents the abscissa while torque 1820 (pounds-force) represents the ordinate. A legend 1830 identifies lines for weight torque 1840, lift assistance torque 1850, and net work 1860 required to lift hatch. Despite the weight being greater than 20 lb$_f$ at horizontal (closed hatch), the lift assist linearly negates this force so that the maximum force for manipulating the hatch cover 140 is about four pounds-force.

FIGS. 19A through 19E show expected tabular views 1900 of gear stresses on teeth and bearings. FIG. 19A includes gear interface values. FIG. 19B includes tangent force. FIG. 19C includes normal force. FIG. 19D includes fatigue strength. FIG. 19E includes bearing forces based on gear location.

Exemplary embodiments provide a low profile clamping mechanism with torsion bar lift assist and variable force for a naval hatch. Efforts for this object led to developing a hatch with robust sealing and lift assist mechanism able to significantly reduce the force needed to open the hatch. This is a subassembly of a hatch mechanism designed to replace the conventional Mk-46 turret hatch. For these purposes, the Mk-46 is integrated into the Mk-50 Gun Mission Module (GMM).

The previous designed conventional hatch had issues with leaking and electromagnetic interference (EMI). Additionally, the conventional hatch was not believed to survive green water loading requirements. This led to redesign of the hatch cover 140 to alleviate these issues increased the weight of the assembly. The exemplary lift assist 1310 was implemented to reduce load on the operator during open the exemplary hatch cover 140. Normal commercial systems such as gas spring lift, assists were not considered because of reliability issues in harsh environments.

The lift assist torque is supplied by the torsion bar 260. This torsion bar 260 supplies a high torque (120 ft-lbs) at a low angle (15°), twisting from its bracket 270. A gear-ratio mechanism is used to reduce this initial torque at a high angle (20 ft-lbs at 90°). This is accomplished in lieu of traditional high torque torsion springs to keep the entire hatch hinge mechanism as low profile as possible. An additional subassembly of the hinge system is a double-over center pawl 1350 that enables the hatch and lift assist mechanism 1310 to be locked open or locked closed before or after the hatch cover 140 is moved into that position.

The dog-locks 320 pull the hatch cover 140 down securely over the interface frame 130. The force prescribed for this action must be sufficient to compress the gasket 135, but not so much as to be difficult to operate or cause damage to the mechanism. The exemplary mechanism described can generate a torque of 100 in-lbs at four different locations with the operation of a hand crank 220 with the worm gear assembly 510 that increases torque by a ratio of 20:1. The clamping force is set by four set screws 1050 set into rotating pawls 1350.

Upon rotating the pawls 1340 into position, a torque wrench can be employed to dial in the desired force at each of the pawls 1350. Opening and reclosing the hatch cover 140 should return it to the same position and generate identical clamping force. The clamping mechanism also contains a lock that incorporates an intermittent motion gear set. The intermittent motion mechanism comprised of the driver wheel 520 and the driven wheel 530 reduces the footprint of the lock while enabling the hand crank 220 to rotate six times before locking with minimal torque.

The conventional Mk-46 hatch has difficulties with weather tightness, as well as a lack of EMI shielding around the hatch opening 145. The conventional hatch can be difficult to lift open. Navy procedures preclude passing green water while loading. Consequently, the conventional hatch can be replaced by an exemplary hatch cover 140 that contains an EMI gasket and weather seal 135 as well as a lift assist mechanism 1310.

The exemplary solution includes replacing the conventional hatch with an exemplary hatch cover 140 containing an EMI gasket 135 with weather sealing and the lift assist mechanism 1310. The process includes: clamp down flange for gasket groove to existing Mk-46 structure hinge assembly base frame 250 that contains lift assist, lock and hinge. This also includes a single lockable pin 630 with pull lanyard for the pull handle 155.

The intermittent motion gear 610 constrains the worm gear assembly 510, which also constrains the four dog-locks 320, each including the locking mechanism shown in view 1700, and lifting mechanisms in view 1300. The torsion bar 260 and the bracket 270 for the lifting mechanism 1310 assist in raising the hatch arms 150. The design further includes gear reducers as spurs 370 and 380. Design constraints include torque 22.5 ft-lb at hinge 360, 22.5 N ft-bar, where N is positive integer; rotation 90° at the hinge 360, 1.570796/N radians at the torsion bar 260; and fatigue life of 100,000 cycles.

Governing equations: $\phi$ angle of twist, T torque, L length, G shear modulus, $I_p$, is polar moment of inertia, r radius, $\tau_{tan}$ is max tangential shear stress, K is stress concentration. G=11,054 ksi, max von Mises stress (fatigue)=170 ksi; L=10.25 in, N=8, r=0.2458 inches, $\tau_{tan}$ =83.3 ksi (including K=1.2). Material preferred would be 13-8 Mo stainless steel H1000. One can enforce superposition to find von Mises stress and correlate to fatigue curve in Department of Transportation FAA-AR-MMPDS-01:

$$\sigma_V = \sqrt{\frac{\sigma_{long}^2 + 6(\tau_{rad}^2 + \tau_{tan}^2)}{2}}, \quad (1)$$

where $\sigma_Y$ is 167.2 ksi, stress ratio about zero. Lift assist torque angle for hatch lift assist is indicated in graphical view 1800.

View 900 shows arc angles and tensile forces for lift assist. In this instance:

$$F_T = \frac{T}{r_g}, \qquad (2)$$

where $\sigma_V$ is tangential force (reaction), T is torque, and $r_g$ is gear radius for view 800. Also view 900 shows Lewis Equation for gear-tooth bending stress: σ is max stress, P is pitch, b is gear thickness, J is geometry factor, $K_o$ is overload factor, $K_v$ is velocity factor, $K_m$ is mounting factor—view 1900 table. View 1200 features latch mechanism components for the worm assembly 510 that includes the worm 1220 and four gears 410 with 20:1 gear ratio.

This entails five rotations to fully actuate the dogs 340: four worm gears 410 and a worm 1220 are held in single bolt-down worm hub 310. The dog-lock 320 is a conventional component that holds both mating miter gears 430 and 440, and bolts to the hatch cover 140.

The first miter gear 440 changes direction of torque with 1:1 ratio. The second miter gear 450 includes a tapped hole for ¼"-20 set screw. The screw torque enables adjustable in gasket pressure. The dog-locks 320 are loaded at 100 lb$_f$ each correlates to 1.8 ft-lbs at the hand crank 220. Lewis gear values for gear-tooth bending stress diagrammed in view 900 are listed in tabular view 1900.

Gear stress calculation worm from view 1100 includes:

$$F_{gt} = F_n \cos \phi_n \cos \lambda + f \sin \lambda, \qquad (3)$$

$$F_{gt} \leq F_s, F_w, \qquad (4)$$

$$F_s = S_n b p y, \qquad (5)$$

$$\text{and } F_w = d_g b k_w, \qquad (6)$$

quantified by tabular views 1900, where $F_{gt}$ is actual tooth load, $F_n$ is normal tooth load, f is friction coefficient, λ is lead angle, $\phi_n$ is pressure angle, $F_s$ is desired loading (tooth being), $F_w$ is desired load (surface wear), $S_n$ z is fatigue strength, p is gear pitch b is gear thickness, y is geometry factor, $d_s$ is pitch diameter, $K_w$ is material geometry factor, $K_m$ is mounting factor.

The lift assist hinge mechanisms 1310 include the ratchet 1320 with its single tooth rotating on the hinge bar 1325 and a dual direction pawl 1350, which enables locking either reopen or closed. The spring shaft 1370 enables a spring to force the pawl 1350 to always return to lock open or lock closed position. Locking mechanisms include the hinge lock handle 155, a cavity for the compression spring 1660, a pivot enables the hinge locking assembly 1310 to be pushed into lock open position irrespective of handle position, or alternatively to be placed in locked closed position when pushing the pull lever 155 down.

Locking mechanisms include the latch lock 1610. The exemplary hub 310 is directly attached to driver gear 520 containing the hand crank 220 and locks all components together. The gear interface 640 between separate gears includes an intermittent motion mechanism comprised of gears 520 and 530, which move like a Geneva wheel with torque transmission of a locking pin at the hole 630 having spring loaded gear teeth.

The exemplary driven wheel 530 locks every sixth rotation, and the pull handle 155 releases the locking pin 630. The inner periphery of the hatch frame 130 with environmental EMI, gasket 135 having low pressure surface. The base backing plate 180 contains the gasket 135 to cover previous hatch mounting penetrations.

Tabular view 1800 shows beam analysis for the torsion bar 260:

$$\tau_{rad} = \frac{V}{A} \qquad (7)$$

as max radial sheer stress, V is shear force, A is cross-section-area; $\tau_{rad}$=699 psi. This can be shown by a moment diagram by the relation:

$$\sigma_{long} = \frac{My}{I} = 82.9 \text{ ksi}, \qquad (8)$$

where M is the moment, I is moment of inertia, $\sigma_{long}$ is maximum longitudinal stress in view 1900 bearing stress for lift assist.

The crux of exemplary embodiments constitutes a subassembly of a hatch mechanism designed to replace the conventional U.S. Navy Mk-46 turret hatch in current inventory, wherein the Mk-46 is integrated into the Mk-50 Gun Mission Module (GMM). The lift assist torque is supplied, according to exemplary embodiments by the torsion bar 260, which supplies high torque (e.g., 120 ft-lbs) at a low angle (e.g., 15°).

A gear-ratio mechanism reduces this torque, and torsion springs, such as torsion bar 260, maintain the profile of the entire hatch hinge mechanism contained in hinge assembly base frame 250 as low as possible. See plot view 1800. An additional embodiment concerns a subassembly of the hinge system; a double-over center pawl 1340 that enables the hatch cover 140 and lift assist mechanism contained in hinge assembly base frame 250 to be locked open or locked closed before or after the hatch cover 140 is moved into that position.

The clamping mechanism is used to pull the cover down securely over the hatch 120. The force prescribed for this action must be, adequate for seal compression, but not so much as to be difficult to operate or cause damage to the mechanism. The exemplary mechanism can generate a torque of 100 in-lbs at four different locations by the hand crank 220 with a worm gear 1220 and four worm wheels 410, which increases torque by 20:1.

The clamping force is set by four set screws 1050 set into rotating pawls 1440. Once the pawls 1440 are rotated in position, a torque wrench can be used to dial in the desired force at each of the pawls 1440. When the hatch cover 140 opens and recloses, the set-screw 1050 returns to the exact same position and generate the same clamping force. The exemplary dogging mechanism 340 preferably also contains a lock that employs an intermittent motion gear set. An intermittent motion interface 650 keeps the footprint of the lock very small while enabling the hand crank 220 to rotate as many as six times before locking.

This system can be used in any environment in which a significant amount of torque is needed through a limited angle (e.g., 90°) such as a hatch or hood lift assist. This system is designed to become a component in the baseline of the Engineering Design Model 3 (EDM 3) of the Littoral Combat Ship (LCS) Gun Mission Module (GMM).

The advantages of the unique features of the exemplary system are numerous. This exemplary system incorporates a gear ratio to transform the torque and angle of the torsion bar 260. This enables designing a lower profile and smaller footprint over traditional torsion springs. The reason a low profile is desired is twofold. First, the geometry permits more headroom for the operator. Second, the exemplary design maintains the hinge axis to be close to the boundary of the turret. The motion of the hatch cover 140 can become degraded as the hinge axis migrates further from the boundary of the turret. Additionally, the incorporation of the torsion bar 260 increases resistance to fatigue and reliability over gas springs.

The exemplary clamping mechanism is designed to provide definable clamping force that remedies the leaking experienced by conventional hatches. Additionally, the incorporation of set screws in the pawls 1340 facilitates successful installation even for uneven mating surfaces, or interfaces at an unexpected height.

The hatch cover 140 generally comprises hatch frame 130 set in deck 120 or bulkhead wall 160 with hatch cover 140 (open) and 190 (closed) seated on hatch, gasket 135 over opening 145 in hatch frame 130 and attached thereto via arms 150 and operated by the pull lever 155. The hatch cover 140 is positioned to rest on backer plate 180 when in fully open position.

The locking pawl assembly 210 for gear reduction is shown affixed to the underside of hatch cover 140 on adjustment plate 240 via central mounting bracket 310, cap 315, and pawl mounting bracket 320. The pawl assembly 210 is operated by hand crank 220, proximity sensor 230, miter gear 340, transmission rod 335 and worm wheel 330. Also shown is the torsion bar 260.

Torsion bar 260 is affixed to base 270 and is defined by hatch hinge rod 360 (containing two external involute splines 1330 and 1335), partial spur gear 370 (3" diameter pitch, two entries), spur gear 380 (multiple 1" and 2" pitch diameters), spur gear 710 (contains an internal involute spline 750). Also shown is torsion bar lift assist 1300 with gear multiplier assembly comprising gears 370, 380 and 710 (1" pitch diameter) with spur gear teeth (all 12" diametrical pitch). The spur gear 370 is shown with internal involute spline 830.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A lift assist mechanism for positioning a hatch cover in relation to a corresponding opening in a hatch frame, said mechanism comprising:
   a torsion bar having first and second opposite ends, said first end secured to the hatch frame, said second end connecting to a bar spur gear; and
   a lifting assembly including a lift spur gear and a hinge gear, said lift spur gear engaging said bar spur gear, wherein said gears convert an acute angle twist of said bar to substantially perpendicular pivot the hatch cover from the hatch frame.

2. The lift-assist mechanism according to claim 1, further including a double end pawl to enable locking in either closed and open positions.

3. The lift-assist mechanism according to claim 1, wherein said bar spur gear has 3:1 gear ratio from said torsion bar, said lift spur gear has a 2:1 gear ratio from said bar spur gear.

4. A locking mechanism for releaseably securing a hatch cover to a corresponding opening in a hatch frame, said mechanism comprising:
   a central hub disposed on the hatch cover, said hub including a worm gear and a plurality of sprockets that rotate in response to said worm gear; and
   a plurality of armatures corresponding to said plurality of sprockets, each armature including a rotating dog-lock disposed adjacent a rim on the hatch cover and a corresponding shaft that rotably connects a sprocket to said dog-lock; wherein
   said dog-lock including a latch that pivots between a locking position that engages the hatch frame and a release position in response to rotation by said worm gear.

5. The locking mechanism according to claim 4, further including a crank wheel for rotating said worm gear.

6. The locking mechanism according to claim 5, further including driver and driven wheels for aligning said crank wheel to said center hub.

7. The locking mechanism according to claim 4, wherein said dog-lock includes a pair of miter gears to directionally translate rotation from said shaft to pivot said latch.

8. The locking mechanism according to claim 4, wherein said each dog-lock of said plurality includes a set screw for adjusting a gap between said latch and the hatch frame.

* * * * *